US012492706B1

(12) United States Patent
Symons (10) Patent No.: US 12,492,706 B1
(45) Date of Patent: Dec. 9, 2025

(54) IMPELLER FOR AUTOMATED MICROFOAMING

(71) Applicant: Dominic Symons, Singapore (SG)

(72) Inventor: Dominic Symons, Singapore (SG)

(73) Assignee: Subminimal Pte. Ltd., Singapore (SG)

( * ) Notice: Subject to any disclaimer, the term of this patent is extended or adjusted under 35 U.S.C. 154(b) by 0 days.

(21) Appl. No.: 19/198,072

(22) Filed: May 4, 2025

(51) Int. Cl.
*A47J 31/44* (2006.01)
*F04D 29/24* (2006.01)

(52) U.S. Cl.
CPC ........ *F04D 29/242* (2013.01); *A47J 31/4496* (2013.01)

(58) Field of Classification Search
CPC .............. A47J 31/4496; A23C 9/1524; A23C 2210/30; B01F 27/1152
See application file for complete search history.

(56) References Cited

U.S. PATENT DOCUMENTS

| | | | |
|---|---|---|---|
| 9,873,097 B1 * | 1/2018 | Dushine | B01F 35/3204 |
| D880,933 S | 4/2020 | Symons | |
| D881,636 S | 4/2020 | Symons | |
| 10,631,686 B2 | 4/2020 | Abdo | |
| 10,638,872 B2 | 5/2020 | Balkau | |
| D927,931 S | 8/2021 | Kuchinski | |
| 11,864,687 B2 | 1/2024 | Symons | |
| D1,058,291 S | 1/2025 | Symons | |
| D1,062,363 S | 2/2025 | Symons | |
| D1,063,529 S | 2/2025 | Symons | |
| 2020/0113369 A1 * | 4/2020 | Bardot | A47J 31/20 |
| 2020/0360874 A1 * | 11/2020 | Symons | B01F 27/071 |

OTHER PUBLICATIONS https://bigbigmart.com/product/dreo-baristamaker-milk-frother-all-in-1 . . . tomatic-milk-warmer-dairy-plant-based-milk-30-drinks-dishwasher-safe/; printed Apr. 23, 2025 (9 pages).
https://www.amazon.com/Bellemain-Stainless-Steel-Frother-capacity/dp/B010E1ZQVC/; printed Apr. 23, 2025 (14 pages).
https://www.amazon.com/Capresso-209-05-Frother/dp/B07TKF5LLB?ref_=ast_sto_dp&th=1/; printed Apr. 24, 2025 (15 pages).

(Continued)

*Primary Examiner* — Courtney D Heinle
*Assistant Examiner* — Danielle M. Christensen
(74) *Attorney, Agent, or Firm* — Todd R. Miller (57) ABSTRACT

An impeller for automated microfoaming is disclosed. The impeller may comprise a base, a means for coupling the base to a motor, a support wall extending upward from the base, a blade extending upward from the support wall, a shroud disposed about the blade, and a screen coupled to the shroud. The support wall gradually curves inward toward the central axis of the base. The support wall defines a channel, wherein the support wall and base define an outlet in communication with the channel. The blade extends along the support wall. The blade defines an inlet in fluid communication with the channel. The shroud comprises a ring and a wall extending downward from the ring. The wall of the shroud engages the support wall. The coupling means may comprise a first set of magnets disposed about the impeller, and a second set of magnets disposed about the motor.

17 Claims, 5 Drawing Sheets

(56) References Cited

OTHER PUBLICATIONS https://www.amazon.com/s?k=delonghi+magnetic+whisk+frother&crid=,,,efix=delonghi+magnetic+whisk+frother%2Caps%2C126&ref=nb_sb_noss; printed Apr. 24, 2025 (11 pages).
https://www.dreo.com/products/whisk-set-replacement-for-barist . . . BOor_OOwStOYvBXEllsiZ5X3Xw457HKZHmyrJ3Q8Wfmb64Tx4hvRMfsw&gQT=1; printed Apr. 24, 2025 (5 pages).
https://www.homedepot.com/p/Rosle-Dual-Speed-Frother-9-in-Milk-Frother-12961/326144942; printed Apr. 24, 2020 (6 pages).
https://www.amazon.com/Secura-Housewares-Replacement-MMF-809-W . . . =1745522184&sprefix=delonghi+milk+frother%2Caps%2C175&sr=8-33; printed Apr. 24, 2025 (9 pages).

* cited by examiner

IMPELLER FOR AUTOMATED MICROFOAMING

BACKGROUND

The present disclosure relates generally to a tool for preparing milk or milk-alternative for espresso or cocoa-based drinks such as cappuccinos, cafe lattes, and mochas.

OBJECT AND SUMMARY

The object of the instant invention is to create a device that can produce microfoam repeatedly, consistently, and quickly without any learned skill or technique.

One exemplary embodiment of the disclosed subject matter is a novel impeller for automated microfoaming. The impeller preferably comprises a base, a means for coupling the base to a motor, a support wall extending upward from the base, a blade extending upward from the support wall, a shroud disposed about the blade, and a screen coupled to the shroud. The base has a top, an opposing bottom, and a central axis. The base is preferably substantially circular having an outer edge. A first end of the support wall extends upward from or about the outer edge. The support wall gradually curves inward toward the central axis of the base such that the second end of the support wall extends upward from or about the central axis. The support wall defines a channel, wherein the support wall and base define an outlet in communication with the channel.

A first end of the blade extends upward from or about a second end of the support wall. The blade extends along the support wall with a second end of the blade extending upward from the support wall from or about the first end of the support wall. The blade defines an inlet in fluid communication with the channel.

The shroud preferably comprises a ring, which may have knurls, and a wall extending downward from the ring. The wall of the shroud preferably engages the support wall. The coupling means may comprise magnets disposed about the bottom of the base for magnetically engaging the motor. In the alternative, the base may have receptacle, wherein the coupling means comprises magnets about the receptacle at the bottom of base for magnetically engaging the motor.

Another exemplary embodiment of the novel impeller for automated microfoaming includes a substantially circular base, a means for coupling the base to a motor, first and second curved support walls extending upward from the base, first and second curved blades extending upward from their respective support walls, first and second outlets, a shroud, a screen coupled to the shroud, and an inlet defined by the first and second curved blades.

The first curved support wall preferably extends upward from the outer edge of the base and curves radially inward toward the central axis of the base. A first end of the first curved blade extends upward from or about a second end of the first curved support wall. The second end of the first curved blade extends upward from or about the first end of the first curved support wall. A second curved support wall preferably extends upward from the outer edge of the base and curves radially inward toward the central axis. A first end of the second curved blade extends upward from or about a second end of the second curved support wall. The second end of the second curved blade extends upward from or about the first end of the second curved support wall.

The first outlet is preferably defined by the base, the second end of the first curved support wall, and the first end of the first blade. The second outlet is preferably defined by the base, the second end of the second curved support wall, and the first end of the second blade.

The shroud preferably has a ring and a wall extending downward from the ring. The wall of the shroud is preferably seated about the curved support walls.

Another exemplary embodiment of the disclosed subject matter is an automated frother for microfoaming a liquid. The microfoamer preferably includes a vessel for containing the liquid, an impeller disposed within the vessel, and a motor for spinning the impeller. The impeller preferably has a substantially circular base having an outer edge and a central axis. A first support wall extends upward from the base from or about the outer edge and curves inward toward the central axis. A first blade extends upward from the first support wall. A second support wall extends upward from the base from or about the outer edge and curving inward toward the central axis. A second blade extends upward from the second support wall.

A shroud, having a screen coupled thereto, is disposed about the first and second blades. The shroud may be fixed to the support walls. The shroud may have knurls for aiding the microfoaming process.

An inlet is defined by the first blade and the second blade, wherein the inlet receives the liquid to be microfoamed. A first outlet is defined by the first support wall, the second support wall, and the base, wherein the first outlet allows the liquid to be ejected radially outward away from the central axis while being microfoamed. A second outlet is defined by the first support wall, the second support wall, and the base, wherein the second outlet allows the liquid to be ejected radially outward away from the central axis while being microfoamed.

The motor is preferably variable-speed, wherein the vessel includes at least one button for varying power to the motor. The vessel may include a first container for holding the liquid to be microfoamed. The vessel may also include a second container for holding the motor. The automated frother may also have a means for detachably coupling the impeller to the motor.

BRIEF DESCRIPTION OF THE DRAWINGS

Some non-limiting exemplary embodiments of the disclosed subject matter are illustrated in the following drawings. Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described. Dimensions of components and features shown in the figures are chosen for convenience or clarity of presentation. For convenience or clarity, some elements or structures are not shown or shown only partially and/or with different perspective or from different point of views.

DETAILED DESCRIPTION

The preparation of quality silky textured milk for a cappuccino that allows a barista to create elegant patterns on the drink known as "latte art" is commonly seen in coffee shops. Such shops use large commercial espresso machines containing multiple water boilers, one of which is dedicated to creating scalding and high pressured steam. This steam is pushed through a steam wand at high velocity to heat the milk and create foam. A knowledgeable barista may further break down the bubbles in the foam to create even smaller bubbles, which may be referred to as microfoam. Microfoamed milk mixes with the espresso when being poured and adds a nice perceived sweetness to the final drink.

While it is possible for the home barista to create foam using an espresso machine having a steam boiler and wand, it is quite a different feat to create silky microfoam textured milk suitable for creating latte art. The typical home machine is not as stout as the commercial machines found in coffee shops. Furthermore, many small home espresso machines do not include a second boiler or steam wand at all and only produce espresso, leaving the user unable to create any kind of microfoam milk.

In an attempt to supplement these deficiencies, frothing devices have been designed for home use. Such devices usually employ a small whisk to create ordinarily sized bubbles, resulting in the milk almost immediately separating and having a thick foam texture on top with milk at the bottom. When poured, the milk will come out first followed by a blob of foam at the end. This foam blob does not mix well with the espresso drink, creates a separation of flavors with frothy milk on top and espresso on the bottom, and does not permit the desirable latte art. In short, conventional handheld or automatic milk frothing devices do not create microfoam as there is no mechanism to break the bubbles down into microscopic homogenous milk texture.

One alternative to conventional handheld or automatic milk frothing devices is a French press. The method of use involves adding hot milk to the French press and vigorously pumping the plunger up and down to create foam, then slowing down the plunging motion to submerge the plunger until the foam is smooth. While this method may not achieve the same level of microfoam perfection as a skilled barista with a steam wand, the method is convenient and affordable to most ordinary home baristas.

Another alternative to conventional handheld or automatic milk frothers are the microfoaming devices disclosed in U.S. Pat. No. 11,864,687, invented by the same inventor of the instant invention. These devices use an impeller with a unique configuration of a screen placed downstream of the flow to create the microfoam. Spinning at very high revolutions per minute, the impeller first agitates the milk to create normal foam, then adjusts in position or speed to pull down the newly created foam bubbles and tear them down into ultra-fine bubbles. In the second stage, as the milk, foam, and bubbles cycle around the vessel and through the impeller, the microfoam gradually gets finer and finer until a very homogenous texture, like wet paint, is created.

To create the perfect microfoam with a controllable amount of foam-to-milk ratio, the impeller must remain submerged during the entire second stage. An exposed impeller at any time during this stage may change or ruin the quality of the milk foam. To elaborate, if a deep vortex is formed by accident and the impeller becomes exposed, even for a fraction of a second, more air is added to the mix, and the foam-to-milk ratio changes, with more foam being accidentally created and the resulting texture being thicker than desired. If this accidental aeration happens near the end of the cycle, big bubbles will enter the impeller and will not be broken down, thus ruining the smooth effect of the microfoam.

Moreover, fluids build momentum over time when spun, even if they are being spun at a constant rate. This gradual gain in momentum leads to a gradually deeper vortex, which can expose the impeller, leading back to too much aeration by vortex, as discussed immediately above. Reducing the speed of the impeller removes the risk of accidental aeration; however, a greatly reduced speed also lacks the power to pull the air bubbles down to convert them to microfoam, leaving a layer of big bubbles floating on the surface. Reducing the speed of the impeller too much to avoid accidental aeration is thus not a workable solution.

Therefore, the challenge is finding a solution to allow the impeller to rotate as fast as possible while preventing a deep vortex from forming without using external fixed blades, baffles, or other flow control mechanisms.

Accordingly, a novel impeller and automated frothing device using such novel impeller solving these and other problems is desired.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

Figure 1:
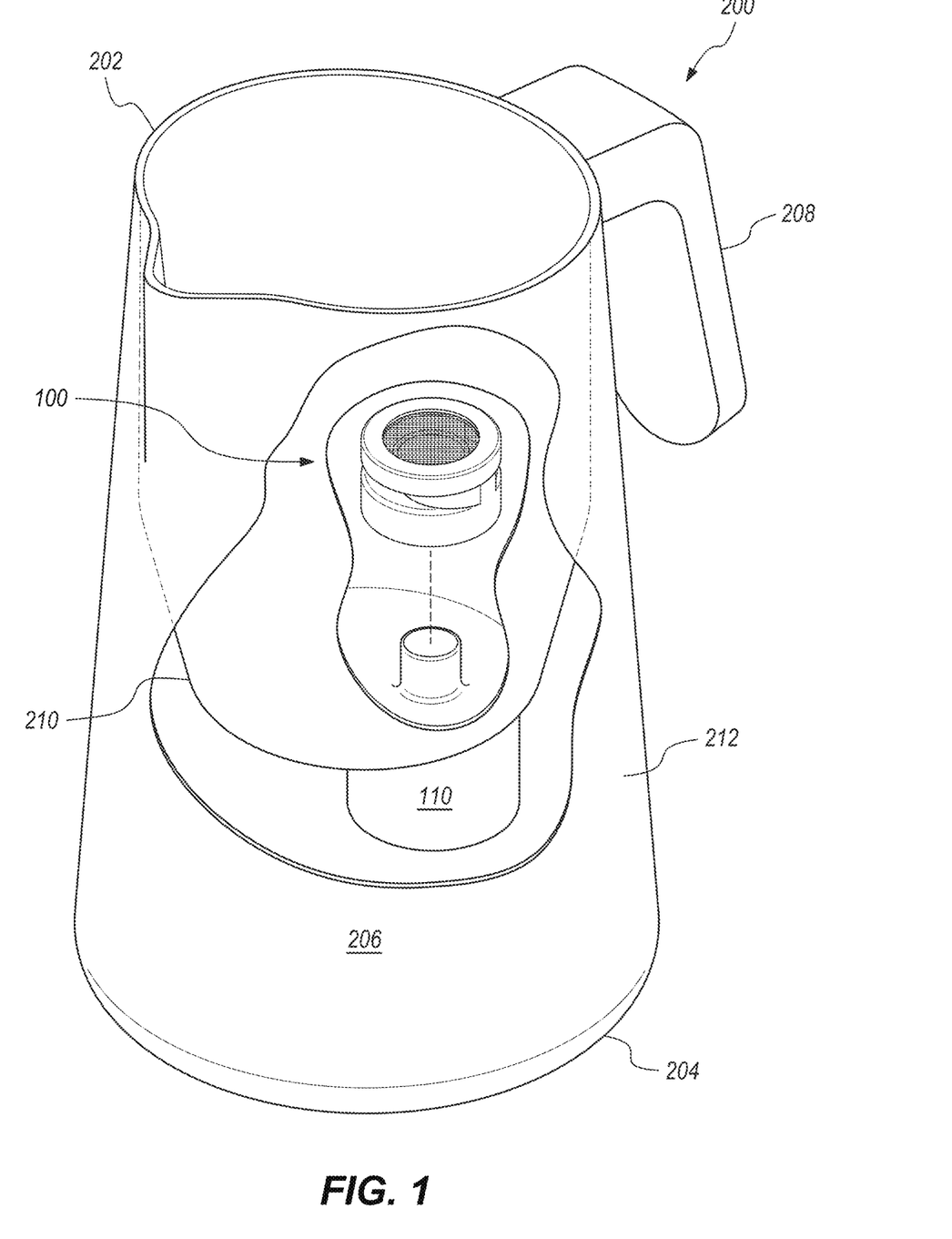
FIG. 1 is a top perspective view of an embodiment of the impeller disclosed herein, wherein the device is shown in its working environment before the impeller is coupled to a motor.
Figure 2:
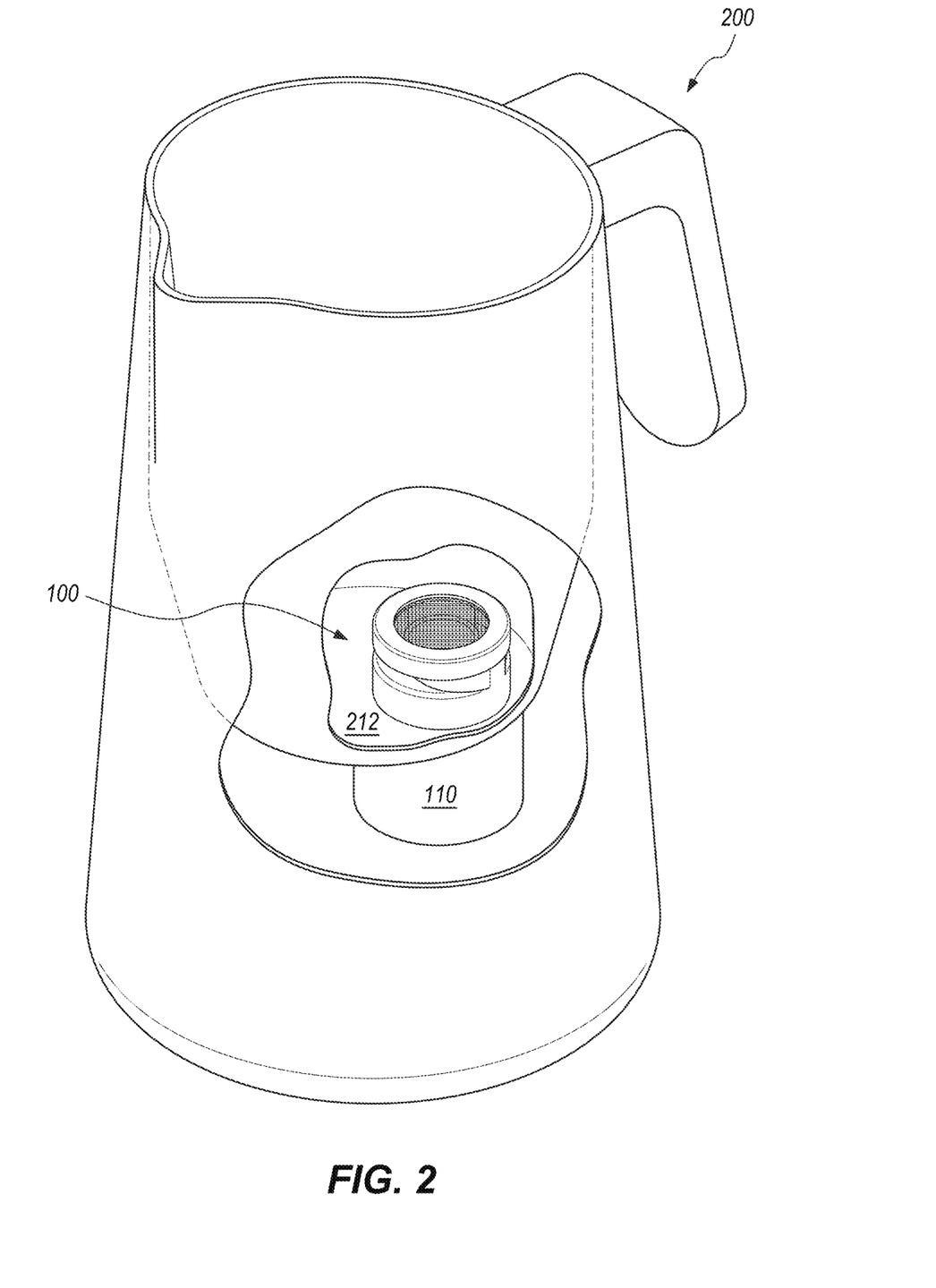
FIG. 2 shows the impeller seen in FIG. 1 after it is coupled to a motor.
Figure 5:
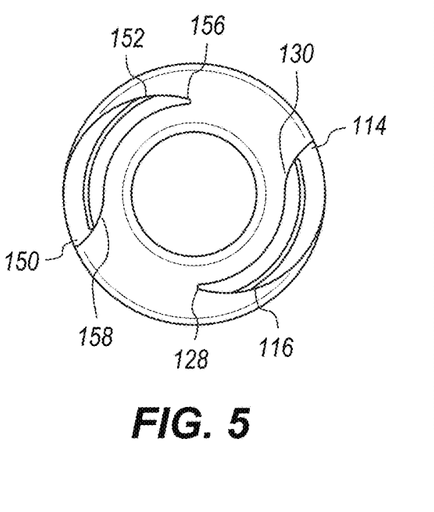
FIG. 5 is a top view of the impeller seen in FIG. 1 without the shroud and screen.
Figure 6A:
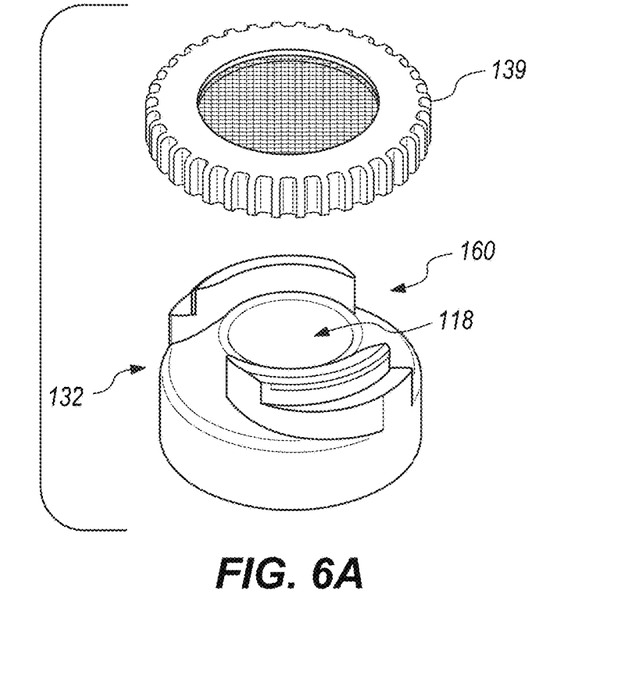
FIG. 6A is an exploded, top perspective view of another embodiment of the impeller disclosed herein, wherein the shroud has knurls.
Figure 6B:
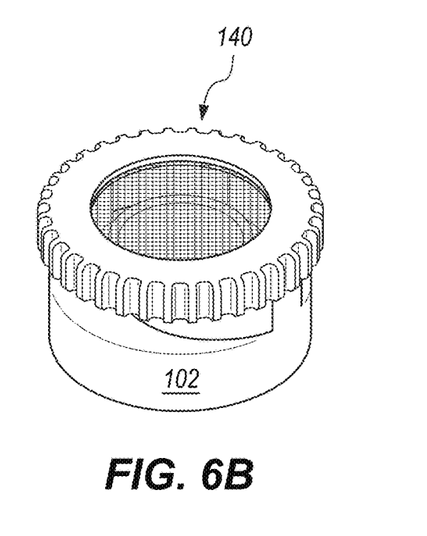
FIG. 6B is a top perspective view of the impeller seen in FIG. 6A.
Figure 6C:
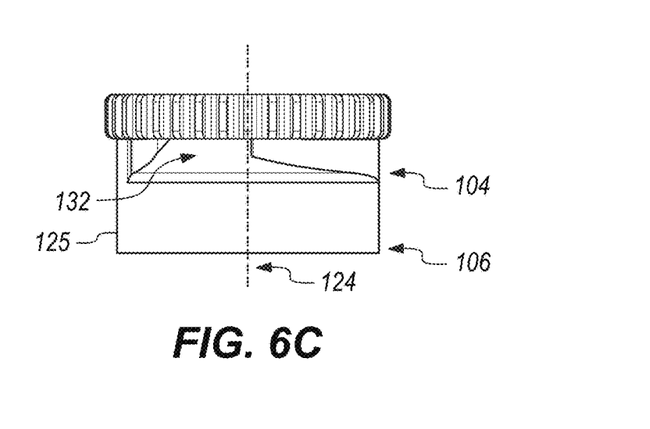
FIG. 6C is a side view of the impeller seen in FIG. 6A.
Figure 7:
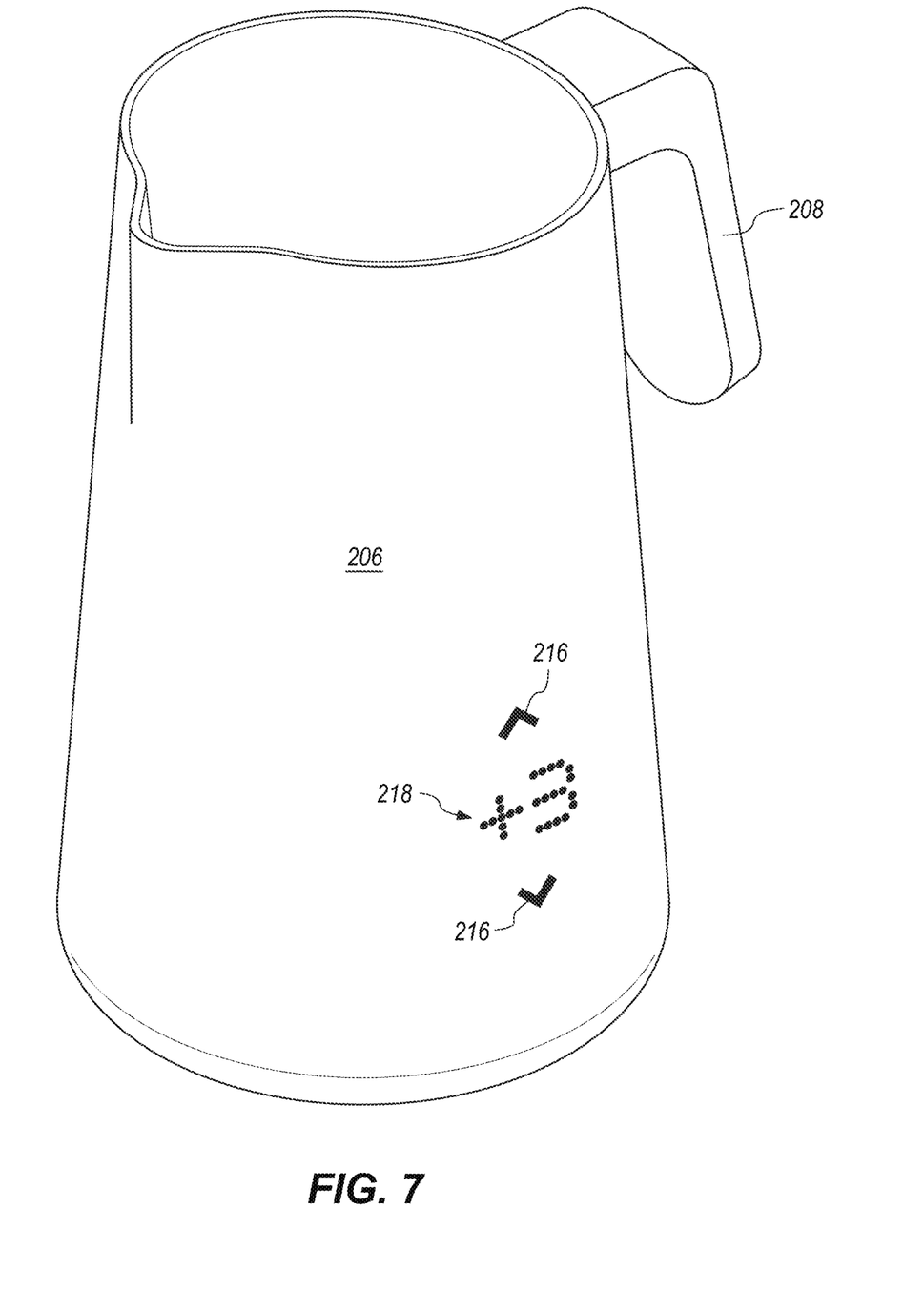
FIG. 7 is a top perspective view of an embodiment of an automated frother with the impeller disclosed herein, wherein the automated frother has means for adjusting the speed of the motor.

FIGS. 1-7 illustrate an impeller 100 for automated frothing of a liquid such as milk or a milk-alternative. The impeller 100 is preferably coupled to a motor 110, both of which may be handheld in a wand-like fashion. The impeller 100 may be contained in a vessel such as a pitcher or jug, and the motor 110 may be disposed outside of the pitcher or jug. FIG. 1 illustrates a vessel 202 having a bottom wall 204 and a side wall 206 extending upward from the bottom wall 204. The vessel 202 may have a handle 208 attached to and extending away from the side wall 206 of the vessel 202. The vessel 202 preferably has a first container 210 with its bottom wall 212, and a second container 214. FIG. 7 particularly illustrates a preferred automated frother 200 wherein the vessel 202 may have one or buttons 216 for varying the power to the motor 110. The motor 110 is preferably a variable-speed motor, wherein a user of the automated frother 200 may push a button 216 to vary the speed of the motor 110, as seen by the indicia 218 on the side wall 206 of the vessel 202 in FIG. 7.

Turning to the details of impeller 100, it preferably comprises a base 102, a means for coupling 108 the base 102 to a motor 110, a support wall 112 extending upward from the base 102, a blade 126 extending upward from the support wall 112, a shroud 134 disposed about the blade 126, and a screen 142 coupled to the shroud 134.

Referring to FIG. 6A, the base 102 has a top 104, an opposing bottom 106, a central axis 124, and an outer edge 125.

Figure 3:
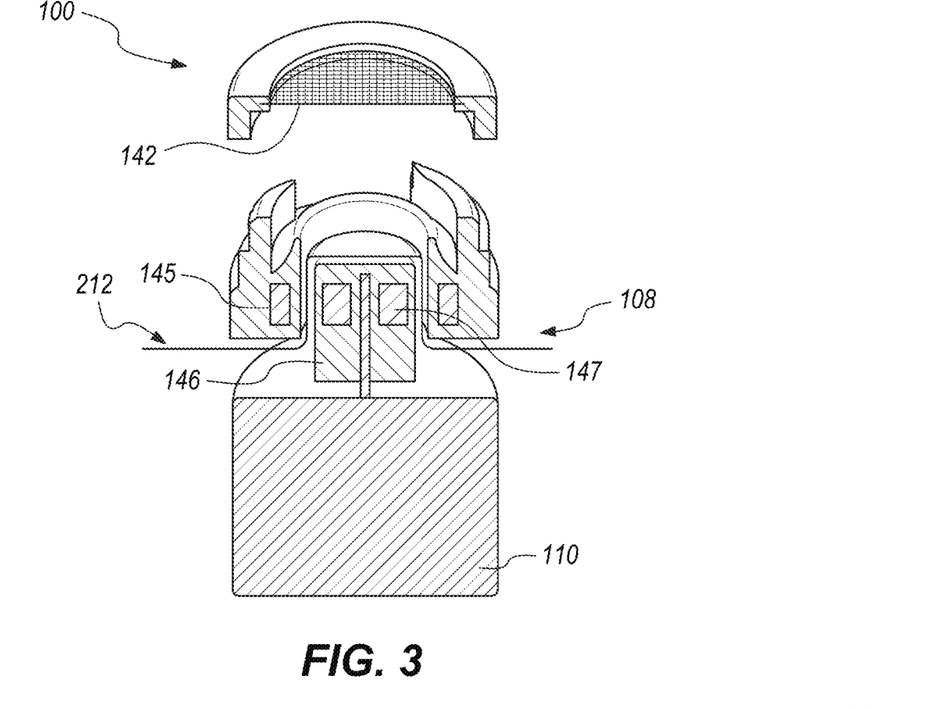
FIG. 3 is an exploded, cross-sectional view of the impeller seen in FIG. 1.
Figure 4A:
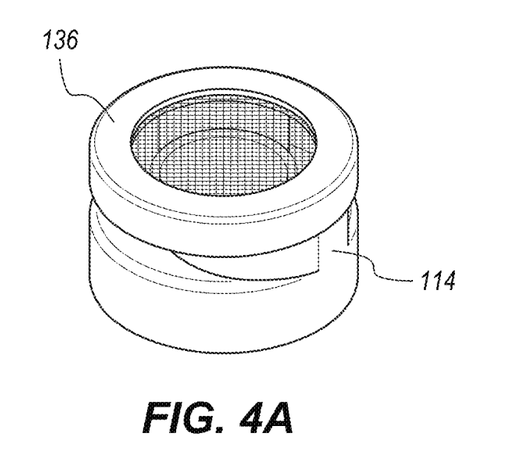
FIG. 4A is a top perspective view of the impeller seen in FIG. 3.
Figure 4B:
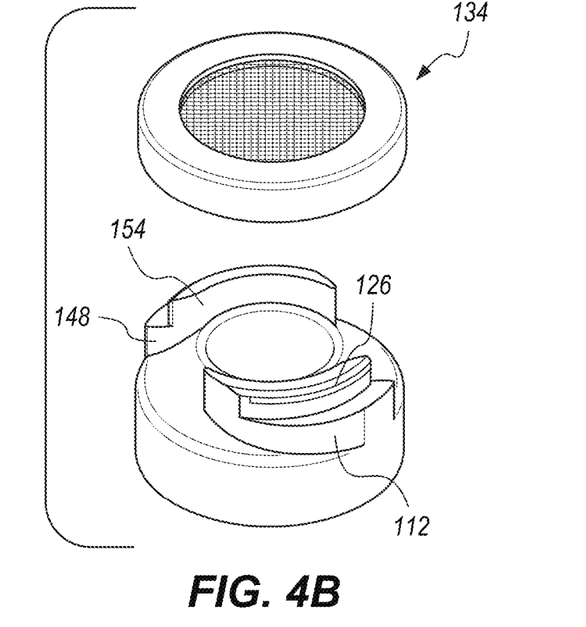
FIG. 4B is an exploded view of the impeller seen in FIG. 4A.

The means for coupling 108 may include the use of magnets, friction-fit, one or more pins or the like, direct mounting, and similar such arrangements. To elaborate with regard to direct mounting, the impeller 100 may be fixed to a motor shaft protruding through the bottom wall 204 of the vessel 202. With regard to a friction-fit arrangement, the base 102 may have a receptacle, such as receptacle 144, and the motor 110 may have a shaft or arm 146 extending therefrom wherein the receptacle 144 is adapted to receive the arm 146 and held in place by friction. With regard to the use of magnets, one arrangement includes magnets concentrically disposed about the impeller and another set of magnets radially along a motor shaft. As best seen in FIG. 3, the means for coupling 108 preferably includes the base 102 having a receptacle 144 adapted to receive an arm 146 of motor 110, a first set of magnets 145 disposed in the base 102 about the receptacle 144, and a second set of matching/opposing magnets 147 in the arm 146 of the motor. An air gap between the two magnets 145, 147 allows the means for coupling 108 to work through the vessel 202 and prevent leaks.

As best seen in FIGS. 5 and 6A-6B, the support wall 112 has a first end 114 and a second end 116. The support wall 112 defines a channel 118, wherein the support wall 112 and base 102 define an outlet 132 in communication with the channel. The blade 126, extending upward from the top of the support wall, defines an inlet 140 in fluid communication with the channel 118.

The impeller 100 preferably includes at least two support walls and blades. As the impeller 100 is preferably miniaturized, the use of fewer blades means each blade may be made larger and stronger. Turning to FIG. 5, the impeller 100 for microfoaming a liquid may include a substantially circular base 102 with its outer edge 125 and central axis 124. A first curved support wall 112, with its first end 114 and second end 116, has its first end 114 extend upward from the outer edge 125. The first curved support wall 112 curves radially inward toward the central axis 124 of base 102. The first curved blade 126, with its first end 128 and second end 130, has its first end 128 extend upward from or about the second end 116 of the first curved support wall 112. The second end 130 of the first curved blade 126 extends upward from or about the first end 114 of the first curved support wall 112. A second curved support wall 148 has a first end 150 and a second end 152, wherein the first end 150 extends upward from the outer edge 125 of the base 102. The second curved support wall 148 also curves radially inward toward the central axis 125 of the base 102. A second curved blade 154, having a first end 156 and a second end 158, extends upward from top of the second curved support wall 148. In particular, the first end 156 of the second curved blade 154 extends upward from or about the second end 152 of the second curved support wall 148. The second end 158 of the second curved blade 154 extends upward from or about the first end 150 of the second curved support wall 148.

With this arrangement, there is a first outlet 132 defined by the base 102, the second end 116 of the first curved support wall 112, and the first end 128 of the first blade 126. There is also a second outlet 160 defined by the base 102, the second end 152 of the second curved support wall 148, and the first end 156 of the second blade 154. The inlet 140 is defined by the first curved blade 126 and the second curved blade 154.

The first curved blade 126 and the second curved blade 154 are preferably designed to curve with a minimal angle to reduce fluid resistance as much as possible and thereby allow the impeller 100 to spin at an incredible speed. Blades 126 and 154 are preferably designed to guide the fluid flow radially toward the outer edge 125 of the base 102 of the impeller 100.

The shroud 134, which may be detachably coupled or fixed to the base 102, preferably includes a ring 136 having a wall 138 extending downward from the wall 138. The ring may have knurls 139, as seen in FIGS. 6A-6C, to aid the microfoaming process. As best seen in FIG. 3, the wall 138 of the shroud 134 is configured to be seated on the top of each of the first and second curved support walls 112, 148. In this manner, the shroud 134, with its screen 142, covers the inlet 140 while also being disposed above each curved blade 126, 154. The position of the screen 142, and the ring-like structure of the shroud 134, increases the efficiency of the impeller 100. Indeed, the disclosed impeller 100 allows for a very small diameter to be created. A small diameter can spin very fast in liquid using less power. Moreover, a small diameter impeller has less contact/friction with the liquid and produces less of a vortex, whereas a large diameter impeller tends to gradually increase the momentum of the spinning liquid and eventually create a deep vortex. Finally, a small diameter impeller allows for a faster-spinning screen 142 to break down big bubbles in the liquid faster and more efficiently than a slow-spinning screen 142.

In operation, a user of the impeller 100 may first desire to clean the impeller 100. To do so, the user may pull the shroud 134 away from the base 102 to unseat the shroud 134 from the support walls 112, 148, and thereby easily clean the device 100. Once cleaned, the user places the impeller 100 onto the arm 146 of the motor 110. The magnets 145, 147 help hold the impeller 100 in place inside the vessel 202 when the motor 110 causes the impeller 100 to spin.

Next, the user pours a liquid to be microfoamed into the vessel 202. The liquid may be a milk or milk-based alternative, wherein the liquid may have varying degrees of viscosity and other properties. While the exact amount of liquid may vary depending on user preference, the user pours enough liquid to cover impeller 100. Once covered, the user turns on the unit 200 and then presses button 216 to change the amount of power to the motor 110.

In the first stage, the motor 110 rotates the impeller 100 extremely fast, creating a deep vortex and exposing impeller 100 to ambient air. This semi-exposed impeller 100 agitates the liquid, which is preferably milk, and makes bubbles.

In the second stage, the impeller 100 is slowed down to reduce the size of the vortex and allow the impeller 100 to rotate fully submerged. In this stage, no additional foam is created as the impeller 100 is not in contact with air. During this submerged stage, the impeller draws milk down through the inlet 140 of the impeller 100, forcing the milk and bubbles through the fast-rotating screen 142. As the milk passes through the screen 142, the bubbles are broken down in to very fine bubbles and ejected out laterally through the outlets 132, 160. Recirculating and cycling this process eventually creates a very fine homogenous microfoam texture.

It should now be apparent that even an inexperienced barista may employ the disclosed impeller and automated frother to create the perfect microfoam. Moreover, one of ordinary skill in the art should also readily understand the novel impeller solves the problems of (1) too much aeration by vortex and, conversely, (2) insufficient speed that introduces big bubbles in the second stage that ruins the smooth effect of the microfoam. In particular, as the screen 142 covers the inlet 140 of the impeller 100, the impeller advantageously rotates as fast as possible while preventing a deep vortex from forming without using external fixed blades, baffles, or other flow control mechanisms. The particular screen-inlet arrangement allows some milk to flow through the channel 118 while the remaining milk flows over the top of the impeller 100 and recirculates. It is this portion of the milk flowing over the impeller 100 that helps close the vortex and prevent aeration, even when rotating at high speeds. With the disclosed arrangement, a user now advantageously has a high-speed impeller that draws milk and bubbles down, cut the bubbles through the fine mesh of the screen, and recirculate the foam while efficiently controlling the vortex depth to avoid accidental aeration.

While certain embodiments have been described, the embodiments have been presented by way of example only and are not intended to limit the scope of the inventions. Indeed, the novel impeller and automated frother described herein may be embodied in a variety of other forms. Furthermore, various omissions, substitutions, and changes in the form of the disclosed elements may be made without departing from the spirit of the inventions. The accompanying claims and their equivalents are intended to cover such forms or modifications as would fall within the scope and spirit of the inventions.

The invention claimed is:

1. An impeller for automated microfoaming comprising:
   a base having a top, an opposing bottom, and a central axis;
   a means for coupling the bottom of the base to a motor;
   a support wall extending upward from the top of the base, the support wall defining a channel, wherein the support wall and base define an outlet in communication with the channel;
   a blade extending upward from the support wall, the blade defining an inlet in fluid communication with the channel;
   a shroud disposed about the blade; and
   a screen coupled to the shroud.

2. The impeller of claim 1, wherein the base is substantially circular having an outer edge, wherein the support wall has a first end and an opposing second end, wherein the first end of the support wall extends upward from or about the outer edge, and wherein the support wall gradually curves inward toward the central axis of the base with the second end of the support wall extending upward from or about the central axis.

3. The impeller of claim 2, wherein the blade has a first end and an opposing second end, wherein the first end of the blade extends upward from or about the second end of the support wall, and wherein the blade extends along the support wall with the second end of the blade extending upward from the support wall from or about the first end of the support wall.

4. The impeller of claim 3, wherein the shroud comprises a ring and a wall extending downward from the ring, wherein the wall of the shroud engages the support wall.

5. The impeller of claim 1, wherein the coupling means comprises magnets disposed about the bottom of the base for magnetically engaging the motor.

6. The impeller of claim 1, wherein the base has a receptacle, and wherein the coupling means comprises magnets about the receptacle at the bottom of base for magnetically engaging the motor.

7. The impeller of claim 1, wherein the shroud has knurls, and wherein the shroud is adapted to engage the support wall.

8. An impeller for microfoaming a liquid comprising:
   a substantially circular base having an outer edge and a central axis;
   a means for coupling the base to a motor;
   a first curved support wall having a first end and a second end, wherein the first end of the first curved support wall extends upward from the outer edge of the base, and wherein the first curved support wall curves radially inward toward the central axis of the base;
   a first curved blade having a first end and a second end, wherein the first end of the first curved blade extends upward from or about the second end of the first curved support wall, and wherein the second end of the first curved blade extends upward from or about the first end of the first curved support wall;
   a second curved support wall having a first end and a second end, wherein the first end of the second curved support wall extends upward from the outer edge of the base, and wherein the second curved support wall curves radially inward toward the central axis of the base;
   a second curved blade having a first end and a second end, wherein the first end of the second curved blade extends upward from or about the second end of the second curved support wall, and wherein the second end of the second curved blade extends upward from or about the first end of the second curved support wall;
   a first outlet defined by the base, the second end of the first curved support wall, and the first end of the first blade;
   a second outlet defined by the base, the second end of the second curved support wall, and the first end of the second blade;
   a shroud having a ring and a wall extending downward from the ring, wherein the wall of the shroud is seated about the first curved support wall and the second curved support wall;
   a screen coupled to the shroud; and
   an inlet defined by the first curved blade and the second curved blade.

9. The impeller of claim 8, wherein the coupling means comprises magnets disposed about the base for magnetically engaging the motor.

10. The impeller of claim 8, wherein the base has a receptacle, and wherein the coupling means comprises magnets disposed about the receptacle for magnetically engaging the motor.

11. An automated frother for microfoaming a liquid comprising:
    a vessel for containing liquid;
    an impeller disposed within the vessel; and
    a motor for spinning the impeller;
    wherein the impeller includes:
       a substantially circular base having an outer edge and a central axis;
       a first support wall extending upward from the base from or about the outer edge and curving inward toward the central axis;
       a first blade extending upward from the first support wall;

a second support wall extending upward from the base from or about the outer edge and curving inward toward the central axis;

a second blade extending upward from the second support wall;

a shroud disposed about the first blade and the second blade;

a screen coupled to the shroud;

an inlet defined by the first blade and the second blade, the inlet for receiving liquid to be microfoamed;

a first outlet defined by the first support wall, the second support wall, and the base, the first outlet for allowing liquid to be ejected radially outward away from the central axis while being microfoamed; and a second outlet defined by the first support wall, the second support wall, and the base, the second outlet for allowing liquid to be ejected radially outward away from the central axis while being microfoamed.

12. The automated frother of claim 11, wherein the shroud is fixed to the first support wall and the second support wall.

13. The automated frother of claim 11, wherein the motor is variable-speed, and wherein the vessel includes at least one button for varying power to the motor.

14. The automated frother of claim 11, wherein the vessel includes a first container for holding liquid to be microfoamed, and wherein the vessel includes a second container for holding the motor.

15. The automated frother of claim 11, further comprising a means for detachably coupling the impeller to the motor.

16. The automated frother of claim 15, wherein the means for detachably coupling comprises a first set of magnets and a second set of magnets, wherein the first set of magnets is disposed about the impeller, and wherein the second set of magnets is disposed about the motor.

17. The automated frother of claim 16, wherein the base includes a receptacle, wherein the motor includes an arm extending therefrom, wherein the receptacle is adapted to receive the arm, wherein the first set of magnets is disposed about the receptacle, and wherein the second set of magnets is disposed about the arm.

* * * * *